(12) United States Patent
Yang

(10) Patent No.: US 9,684,604 B2
(45) Date of Patent: Jun. 20, 2017

(54) ELECTRONIC DEVICE WITH CACHE MEMORY AND METHOD OF OPERATING THE SAME

(71) Applicant: Samsung Electronics Co., Ltd., Suwon-si, Gyeonggi-do (KR)

(72) Inventor: Seungjin Yang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 14/792,869

(22) Filed: Jul. 7, 2015

(65) Prior Publication Data

US 2016/0004636 A1    Jan. 7, 2016

(30) Foreign Application Priority Data

Jul. 7, 2014  (KR) ................. 10-2014-0084516

(51) Int. Cl.
| | |
|---|---|
| *G06F 12/00* | (2006.01) |
| *G06F 13/00* | (2006.01) |
| *G06F 13/28* | (2006.01) |
| *G06F 12/0895* | (2016.01) |
| *G06F 12/0886* | (2016.01) |

(52) U.S. Cl.
CPC ...... *G06F 12/0895* (2013.01); *G06F 12/0886* (2013.01); *G06F 2212/401* (2013.01); *G06F 2212/608* (2013.01)

(58) Field of Classification Search
CPC .................................................. G06F 12/0895
USPC ......................................... 700/118, 119, 120
See application file for complete search history.

(56) References Cited

U.S. PATENT DOCUMENTS

| | | |
|---|---|---|
| 7,143,238 B2 | 11/2006 | Adl-Tabatabai et al. |
| 7,412,564 B2 | 8/2008 | Wood et al. |
| 2001/0001872 A1* | 5/2001 | Singh .................. G06F 12/0802 711/129 |

\* cited by examiner

*Primary Examiner* — Charles Rones
*Assistant Examiner* — Sidney Li
(74) *Attorney, Agent, or Firm* — Jefferson IP Law, LLP

(57) ABSTRACT

An electronic device with a cache memory and a method of operating the electronic device are provided. The electronic device includes a cache memory including a plurality of cache lines each of which includes a first area with at least one storage space and a second area with at least one storage space, where the at least one storage space of the first area has a first size and the at least one storage space of the second area has a second size different from the first size, and a cache controller for storing the data requested for storage in one of the storage spaces of the first or second area, according to a compression factor associated with the data requested for storage when a request is made to store data in the cache memory.

9 Claims, 12 Drawing Sheets

| | Way 0 (64byte) | Way 1 (64byte) | Way 2 (64byte) | Way 3 (64byte) | Way 4 (32byte) | Way 5 (32byte) | Way 6 (32byte) | Way 7 (32byte) |
|---|---|---|---|---|---|---|---|---|
| Index 0 | ▨ | | | | ▨ | | | |
| Index 1 | | ▨ | | | ▨ | | | |
| Index 2 | | | | | | | ▨ | |
| ... | | | | | | | | |
| Index N | ▨ | | | | ▨ | ▨ | | |

13b-2 = {Way 0, Way 1, Way 2, Way 3}
13b-1 = {Way 4, Way 5, Way 6, Way 7}

FIG. 10

| | Way 0 (32byte) | Way 1 (32byte) | Way 2 (32byte) | Way 3 (32byte) | Way 4 (32byte) | Way 5 (32byte) | Way 6 (32byte) | Way 7 (32byte) | Pre-Way 0 (32byte) | Pre-Way 1 (32byte) | Pre-Way 2 (32byte) | Pre-Way 3 (32byte) |
|---|---|---|---|---|---|---|---|---|---|---|---|---|
| Index 0 | ▨ | ▨ | | | | | | | ▨ | | | |
| Index 1 | | ▨ | ▨ | | | | | | ▨ | ▨ | | |
| Index 2 | | | | | | | | | | | | |
| ... | | | | | | | | | | | | |
| Index N | | ▨ | ▨ | | | | | | ▨ | | | |

13d-1 covers Way 0 – Way 7; 13d-2 covers Pre-Way 0 – Pre-Way 3.

ELECTRONIC DEVICE WITH CACHE MEMORY AND METHOD OF OPERATING THE SAME

CROSS-REFERENCE TO RELATED APPLICATION(S)

This application claims the benefit under 35 U.S.C. §119 (a) of a Korean patent application filed on Jul. 7, 2014 in the Korean Intellectual Property Office and assigned serial number 10-2014-0084516, the entire disclosure of which is hereby incorporated by reference.

TECHNICAL FIELD

The present disclosure relates to an electronic device with a cache memory and the method of operating the electronic device.

BACKGROUND

With the rapid development of information and communication technology and semiconductor technology, the use of various types of electronic devices has also increased. Electronic devices have been equipped with a variety of functions for users, e.g., a mobile communication function, a short-range wireless communication function, a broadcast receiving function, an Internet access function, etc.

In general, electronic devices include a cache memory to minimize access latency of a main storage device (e.g., memory). A cache memory is a fast memory device similar to buffers, configured to temporarily store data, commands, or programs read from a main storage device. For example, when a request is made to execute a command or program on an electronic device, the command or program may be quickly executed as it is read from not a main storage device but a cache memory.

The above information is presented as background information only to assist with an understanding of the present disclosure. No determination has been made, and no assertion is made, as to whether any of the above might be applicable as prior art with regard to the present disclosure.

SUMMARY

Cache memory of the related art includes a plurality of cache lines, each of which includes a plurality of storage spaces that are the same in size, e.g., 64 bytes. Cache memory of the related art stores data without compression. Electronic devices of the related art are disadvantageous in that they do not efficiently use cache memory. For example, since each of storage spaces of a cache line is 64 bytes in size, although data can be compressed and stored into 24 bytes, electronic devices of the related art store the data of 24 bytes in the storage space without compressing it.

Aspects of the present disclosure are to address at least the above-mentioned problems and/or disadvantages and to provide at least the advantages described below. Accordingly, an aspect of the present disclosure is to provide an electronic device with a cache memory that efficiently uses storage spaces of the cache memory and a method of operating the electronic device.

In accordance with an aspect of the present disclosure, an electronic device is provided. The electronic device includes a cache memory including a plurality of cache lines each of which includes a first area with at least one storage space and a second area with at least one storage space, where the at least one storage space of the first area has a first size and the at least one storage space of the second area has a second size different from the first size, and a cache controller for storing the data requested for storage in one of the storage spaces of the first or second area, according to a compression factor associated with the data requested for storage when a request is made to store data in the cache memory.

In accordance with another aspect of the present disclosure, an electronic device is provided. The electronic device includes a cache memory including a plurality of cache lines each of which includes a reservation area and a main area with at least one storage space that has a size less than the basic size of data storage, and a cache controller configured to compress the data requested for storage when a request is made to store data in the cache memory, determine whether the compressed data is equal to or less than the size of one of the at least one storage space of the main area, compress the data requested for storage when the compressed data is equal to or less than the size of one of the at least one storage space of the main area, and store the compressed data in one of the storage spaces of the main area.

In accordance with another aspect of the present disclosure, a method of managing a cache memory with a plurality of cache lines, each of which includes a first area with at least one storage space and a second area with at least one storage space, where the at least one storage space of the first area has a first size and the at least one storage area has a second size different from the first size is provided. The method includes detecting a request to store data in the cache memory, and storing the data requested for storage in one of the at least one storage space of the first or second area, according to a compression factor associated with the data requested for storage.

In accordance with another aspect of the present disclosure, a method of managing a cache memory with a plurality of cache lines, each of which includes a reservation area and a main area with at least one storage space that has a size less than the basic size of data storage, is provided. The method includes detecting a request is made to store data in the cache memory, compressing the data requested for storage, determining whether the compressed data is equal to or less than the size of one of the storage spaces of the main area; and storing the compressed data in one of the storage spaces of the main area when the compressed data is equal to or less than the size of one of the storage spaces of the main area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram that describes a state of a cache memory storing data according to the related art;

FIG. 9 is a diagram that describes a state of cache memory shown in FIGS. 2A and 3A that store data according to an embodiment of the present disclosure; and FIG. 10 is a diagram that describes a state of cache memory shown in FIGS. 2B and 3B that store data according to an embodiment of the present disclosure.

Throughout the drawings, it should be noted that like reference numbers are used to depict the same or similar elements, features, and structures.

DETAILED DESCRIPTION

Figure 1:
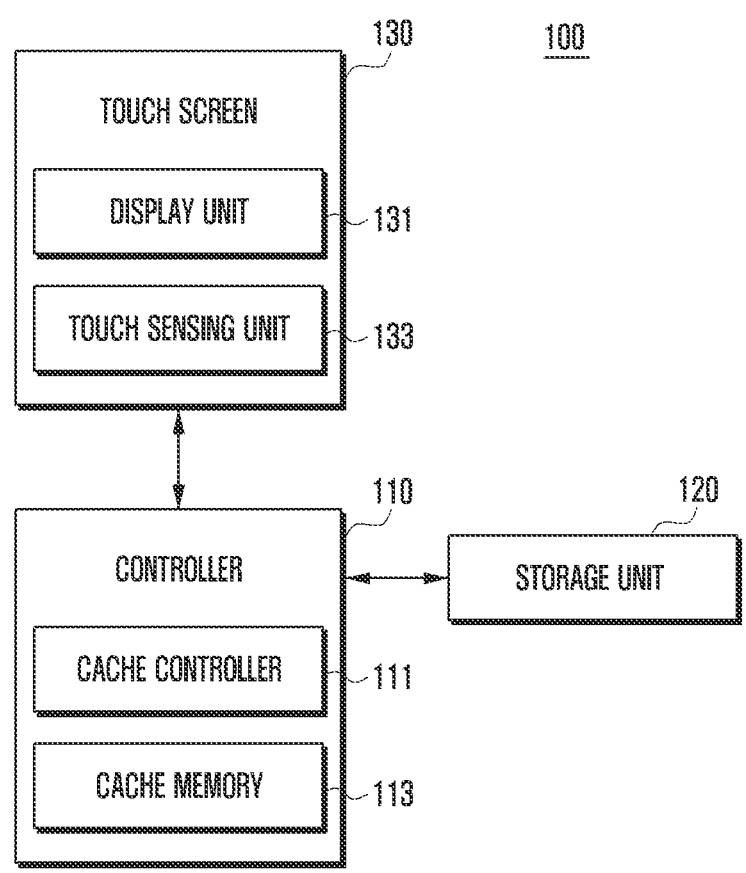
FIG. 1 is a schematic block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in various embodiments of the present disclosure denote the presence of the disclosed functions, operations, and constituent elements and do not limit one or more additional functions, operations, and constituent elements.

In various embodiments of the present disclosure, the terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in various embodiments of the present disclosure, the expression "and/or" includes any and all combinations of the associated listed words. For example, the expression "A and/or B" may include A, may include B, or may include both A and B.

In various embodiments of the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only the component is directly connected or accessed to the other component, but also there may exist another component between the component and the other component. Meanwhile, in the case where according to which a component is referred to as being "directly connected" or "directly accessed" to other component, it should be understood that there is no component therebetween.

The terms used in the present disclosure are only used to describe specific various embodiments, and are not intended to limit the present disclosure.

The terms or words described in the description and the claims should not be limited by a general or lexical meaning, instead should be analyzed as a meaning and a concept through which the inventor defines and describes the present disclosure to the best of his/her ability, to comply with the idea of the present disclosure.

An electronic device according to various embodiments of the present disclosure may be a device including a cache memory. For example, the electronic device corresponds to a combination of at least one of the followings: a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device. Examples of a wearable device are a head-mounted-device (HMD), electronic clothing, an electronic bracelet, an electronic necklace, an appcessory, an electronic tattoo, a smart watch, etc.

According to various embodiments of the present disclosure, an electronic device may be a smart home appliance including a cache memory. Examples of the home appliance are a television (TV), a digital versatile disc (DVD) player, an audio system, a refrigerator, an air-conditioner, a cleaning device, an oven, a microwave oven, a washing machine, an air cleaner, a set-top box, a TV box (e.g., Samsung HOME-SYNC, APPLE TV, or GOOGLE TV), a game console, an electronic dictionary, an electronic key, a camcorder, an electronic album, or the like.

According to various embodiments of the present disclosure, an electronic device may be various medical devices (e.g., magnetic resonance angiography (MRA), magnetic resonance imaging (MRI), computed tomography (CT), a scanning machine, an ultrasonic wave device, etc.), a navigation device, a global positioning system (GPS) receiver, an event data recorder (EDR), a flight data recorder (FDR), a vehicle infotainment device, electronic equipment for ships (e.g., navigation equipment, gyrocompass, etc.), avionics, a security device, a head-mounted device for vehicle, an industrial or home robot, an automatic teller's machine (ATM), a point of sales (POS) system, etc.

According to various embodiments of the present disclosure, an electronic device including a cache memory may be furniture or a portion of a building/structure, an electronic board, an electronic signature receiving device, a projector, various measuring instruments (e.g., a water meter, an electric meter, a gas meter and a wave meter), etc.

According to various embodiments of the present disclosure, an electronic device may include a combination of the components listed above. In addition, an electronic device according to various embodiments of the present disclosure may be a flexible device. It is obvious to those skilled in the art that the electronic device according to various embodiments of the present disclosure is not limited to the aforementioned devices.

Hereinafter, an electronic device according various embodiments of the present disclosure is described in detail with reference to the accompanying drawings. In the description, the term a 'user' is referred to as a person or a device that uses an electronic device, e.g., an artificial intelligent electronic device.

FIG. 1 is a schematic block diagram of an electronic device according to various embodiments of the present disclosure.

Figure 2A:
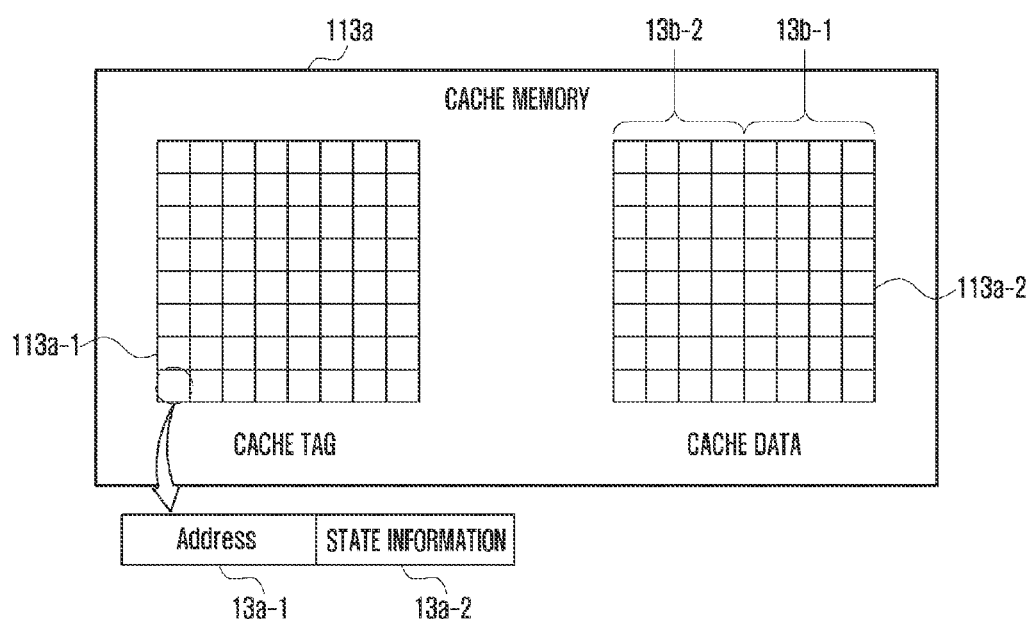
FIGS. 2A and 2B illustrate configurations of a cache memory of the electronic device according to various embodiments of the present disclosure.
Figure 2B:
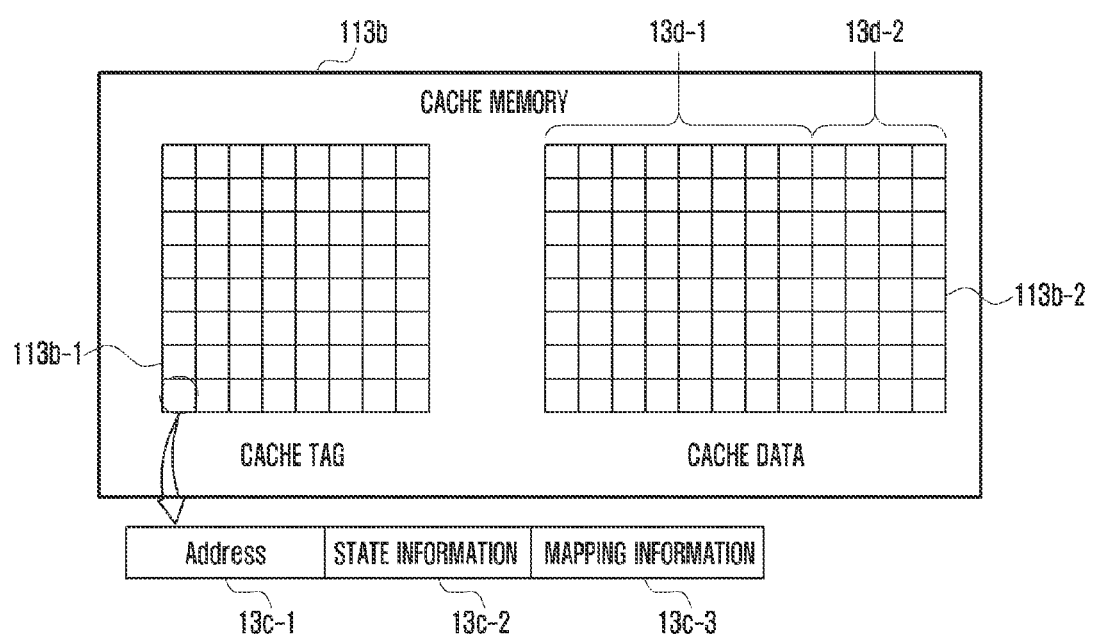

FIGS. 2A and 2B illustrate configurations of a cache memory of the electronic device according to various embodiments of the present disclosure.

Figure 3A:
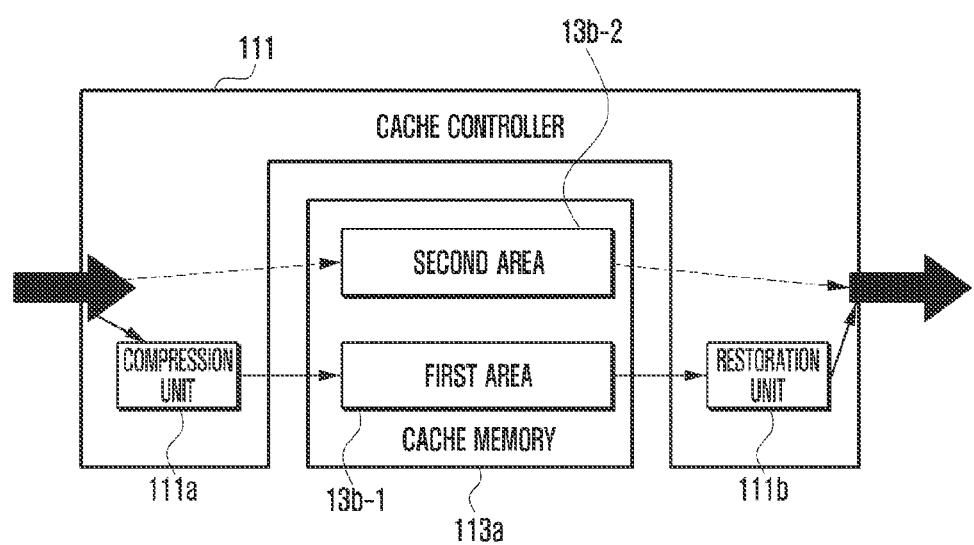
FIGS. 3A and 3B illustrate configurations of a cache controller and a cache memory of the electronic device according to various embodiments of the present disclosure.
Figure 3B:
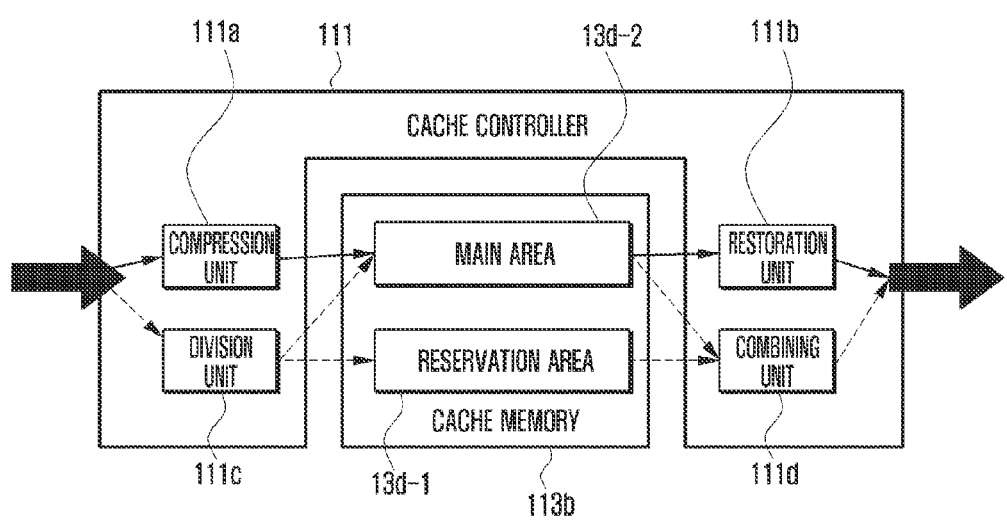

FIGS. 3A and 3B illustrate configurations of a cache controller and a cache memory of the electronic device according to various embodiments of the present disclosure.

Referring to FIGS. 1 to 3B, the electronic device 100 according to various embodiments of the present disclosure includes a controller 110, a storage unit 120 and a touch screen 130.

The controller 110 may control the entire operation of the electronic device 100 and the signals between the components in the electronic device 100. The controller 110 may also perform a data process function. The controller 110 may be implemented with a central processing unit (CPU), an application processor (AP), etc. The controller 110 may also be implemented with a single core processor or a multi-core processor.

The controller 110 according to an embodiment of the present disclosure may include a cache controller 111 and a cache memory 113.

The cache memory 113 is a fast storage device that temporarily stores frequently used data or commands (hereafter commonly called 'data'). More specifically, the cache memory 113 is located between the controller 110 (e.g., CPU) of a relatively fast processing speed and the storage unit 120 (e.g., random access memory (RAM)) of a relatively low processing speed, and may temporarily store frequently used data. For example, the storage unit 120 may be implemented with a memory device, such as dynamic RAM (DRAM) of an access time, 100~150 ns. The cache memory 113 may be implemented with a memory device, such as static RAM (SRAM) of an access time of a few to tens of nanoseconds. As such, data stored in the cache memory 113 may be accessed $\frac{1}{5}$ to $\frac{1}{20}$ faster than the data stored in the storage unit 120. This makes it possible to rapidly process data stored in the cache memory 113.

The structure of the cache memory 113 according to various embodiments of the present disclosure is described referring to FIGS. 2A and 2B. In the following description, the cache memory 112 is called a first cache memory 113a and a second cache memory 113b according to various embodiments of the present disclosure.

Referring to FIG. 2A, the first cache memory 113a may include a first section 113a-1 and a second section 113a-2 where the first section 113a-1 includes a plurality of data storage blocks configured to receive cache data identification information such as a cache tag and the second section 113a-2 includes a plurality of data storage blocks configured to receive cache data.

The information stored in the first section 113a-1 may include information related to: where data stored in the data storage blocks of the second section 113a-2 is stored in the storage unit 120; whether the data stored in the data storage blocks of the second section 113a-2 is valid; whether the data stored in the data storage blocks of the second section 113a-2 is compressed; etc. For example, the cache tag may include address information 13a-1 and status information 13a-2.

The address information 13a-1 includes information associated with an address on the storage unit 120 at which data, corresponding to data stored in the second section 113a-2, is stored. That is, data stored in the storage unit 120 and data stored in the first cache memory 113a may be mapped to each other through the address information 13a-1 of the cache tag stored in the first section 113a-1.

The status information 13a-2 may indicate the status of the data stored in the second section 113a-2. For example, the status information 13a-2 may be information indicating states about whether data is compressed, whether data is valid, and whether data has been modified.

The plurality of storage spaces (e.g., data storage blocks) of the second section 113a-2 may store data requested for storage. The plurality of data storage blocks of the second section 113a-2 according to an embodiment of the present disclosure may include a first area 13b-1 for storing compressed data and a second area 13b-2 for storing noncompressed data. In an exemplary embodiment, a number of data storage blocks in the first area 13b-1 may be the same or different from a number of data storage blocks in the second area 13b-2. For example, area 13b-1 may have the same number of data storage blocks as area 13b-2, area 13b-1 may have more data storage blocks than area 13b-2, or area 13b-1 may have less data storage blocks than area 13-2.

In an exemplary embodiment, one cache line of the second section 113a-2 of cache memory 113a may have the same number of data storage blocks as a cache memory according to the related art. That is, the summation of the number of data storage blocks associated with the first area 13b-1 and the number of data storage blocks associated with the second area 13b-2 is the same as the cache memory according to the related art, i.e., 8. However, any number of data storage blocks associated with the first area 13b-1 and/or the second area 13b-2 may be implemented.

Each of the storage spaces (e.g., data storage blocks) of the first area 13b-1 has a first size. Each of the storage spaces of the second area 13b-2 has a second size. The second size may be a default size of data to be stored in the first cache memory 113a (or the storage unit 120). The first size may be different from the second size. For example, the first size may be less than the second size. In an exemplary embodiment, the first size may be set to half of the second size. For example, each of the storage spaces of the first area 13b-1 may be set to 32 bytes, and each of the storage spaces of the second area 13b-2 may be set to 64 bytes. It should, however, be understood that the present disclosure is not limited to the size of the storage space. That is, each of the storage spaces of the first area 13*b*-1 may be set to various sizes. For example, the size of each of the storage spaces of the first area 13*b*-1 may vary according to attributes of data stored in the first cache memory 113*a*. For example, when the first area 13*b*-1 is used to process data having a relatively high data compression ratio, each of the storage spaces of the first area 13*b*-1 may be set to less than half of the second size. When the first area 13*b*-1 is used to process data having a relatively small data compression ratio, each of the storage spaces of the first area 13*b*-1 may be set to greater than half of the second size and less than the second size.

Referring to FIG. 2A, each cache line is illustrated in such a way that it includes four storage spaces of the first size and four storage spaces of the second area. However, one of ordinary skill in the art would recognize that a cache line of this size is not limited thereto. The number of storage spaces of the first area 13*b*-1 and the second area 13*b*-2 in each cache line may vary according to the manufacturer's design. For example, each cache line may be implemented in such a way that the cache line includes three storage spaces of the first area 13*b*-1 and five storage spaces of the second area 13*b*-2. In addition, each cache line may be implemented in such a way that a ratio of the number of storage spaces of the first area 13*b*-1 and the number of storage spaces of the second area 13*b*-2 varies according to attributes of data. For example, when the first area 13*b*-1 is used to process data having a relatively high data compression ratio, the number of storage spaces of the first area 13*b*-1 may be increased (e.g., 6:2). When the first area 13*b*-1 is used to process data having a relatively small data compression ratio, the number of storage spaces of the first area may be decreased (e.g., 2:6).

Referring to FIG. 2A, in an exemplary embodiment, each cache line of the first cache memory 113*a* may be 384 bytes (=64×4+32×4) in size. The first cache memory 113*a* according to an embodiment of the present disclosure has cache lines each of which is smaller in size than the cache memory according to the related art, 512 bytes (=64×8). A method for storing cache data in the second section 113*a*-2 of the first cache memory 113*a* will be explained later.

Referring to FIG. 2B, the second cache memory 113*b* may include a first section 113*b*-1 and a second section 113*b*-2 where the first section 113*b*-1 includes a plurality of data storage blocks configured to receive cache data identification information such as a cache tag and the second section 113*b*-2 includes a plurality of data storage blocks configured to receive cache data.

The information stored in the first section 113*b*-1 may include address information 13*c*-1, status information 13*c*-2 and mapping information 13*c*-3. It is noted that address information 13*c*-1 and status information 13*c*-2 similarly correspond to address information 13*a*-1 and status information 13*a*-2 described above and as such a description regarding the address information 13*c*-1 and status information 13*c*-2 is omitted below. The mapping information 13*c*-3 refers to information about a connection between data that may be divided and stored in different areas of the second section 113*b*-2 of the memory 113*b* (e.g., main area 13*d*-1 and a reservation area 13*d*-2). For example, if data requested for storage in the second section 113*b*-2 cannot be compressed to a size equal to or less than the storage space of the main area 13*d*-1, the data requested for storage is divided into two parts, i.e., first divided data part and second divided data part, so that one of them is stored in one of the storage spaces of the main area 13*d*-1 and the other is stored in one of the storage spaces of the reservation area 13*d*-2. Location information about a storage space of the reservation area 13*d*-2 in which the second divided data is stored may be stored in the mapping information 13*c*-3 of the first section 113*b*-1 for the first divided data stored in the main area 13*d*-1. The location information may be a number indicating a storage space of the reservation area 13*d*-2. For example, when the location information is '1,' it means that the second divided data has been stored in the first one of the storage spaces of the reservation area 13*d*-2. Similarly, the location information of '2' means that the second divided data has been stored in the second one of the storage spaces of the reservation area 13*d*-2; '3' means that the second divided data has been stored in the third storage space of the reservation area 13*d*-2; and '4' means that the second divided data has been stored in the fourth storage space of the reservation area 13*d*-2.

The second section 113*b*-2 may include a main area 13*d*-1 and a reservation area 13*d*-2. The main area 13*d*-1 and reservation area 13*d*-2 may each have storage spaces that are, in size, identical to or different from each other. Each of the storage spaces of the main area 13*d*-1 and reservation area 13*d*-2 may be a size (e.g., ½) less than the default size of data to be stored in the second cache memory 113*b*. The summation of one storage space of the main area 13*d*-1 and one storage space of the reservation area 13*d*-2 may be equal to the default size of data to be stored in the second cache memory 113*b*. For example, when the default size of data to be stored in the second cache memory 113*b* is 64 bytes, the respective storage spaces of the main area 13*d*-1 and reservation area 13*d*-2 may be 32 bytes. The respective storage spaces of the main area 13*d*-1 may be 24 bytes and the respective storage spaces of the reservation area 13*d*-2 may be 40 bytes. The respective storage spaces of the main area 13*d*-1 may be 40 bytes and the respective storage spaces of the reservation area 13*d*-2 may be 24 bytes. The respective storage spaces of the main area 13*d*-1 and the reservation area 13*d*-2 may vary in size according to attributes of data to be stored. For example, when data having a relatively high data compression ratio is processed, each of the storage spaces of the main area 13*d*-1 may be set to be relatively small and each of the storage spaces of the reservation area 13*d*-2 may be set to be relatively large. On the contrary, when data having a relatively small data compression ratio is processed, each of the storage spaces of the main area 13*d*-1 may be set to be relatively large and each of the storage spaces of the reservation area 13*d*-2 may be set to be relatively small.

The main area 13*d*-1 of each cache line of the second section 113*b*-2 may include the same number of storage spaces as the cache memory of the related art, and the reservation area 13*d*-2 may include storage spaces (e.g., ½) less than the main area 13*d*-1. For example, the main area 13*d*-1 of the second cache memory 113*b* may include eight storage spaces and the reservation area 13*d*-2 may include four storage spaces. It should, however, be understood that the present disclosure is not limited to the number of storage spaces. For example, the number of storage spaces of the reservation area 13*d*-2 of each cache line may be increased when data that cannot be compressed to be stored is usually processed, and decreased when data that can be compressed to be stored is usually processed.

Referring to FIG. 2B, each cache line of the second cache memory 113*b* may be 384 bytes (=32×8+32×4) in size. The second cache memory 113*b* according to an embodiment of the present disclosure has cache lines each of which is smaller in size than the cache memory according to the related art, 512 bytes (=64×8). A method for storing cache data in the second section 113b-2 of cache memory 113b will be explained later.

The cache controller 111 may control to store/read data in/from the cache memory 113. For example, the cache controller 111 may control a function of storing data in the cache memory 113 (e.g., a loading or modifying operation) or a function of reading data from the cache memory 113.

In the following description, the operations of the cache controller 111 according to various embodiments of the present disclosure are explained referring to FIGS. 3A and 3B.

Referring to FIG. 3A, the cache controller 111 may include a compression unit 111a configured to compress data and a restoration unit 111b configured to restore compressed data to the original data.

When a request is made to store data (or to load or modify), the cache controller 111 transfers the data to be stored at cache memory 113a to the compression unit 111a, thereby compressing it. The cache controller 111 may determine whether the compressed data is equal to or less than a preset size (hereafter called a first threshold). The first threshold may be a size of one of the storage spaces of the first area 13b-1. For example, the first threshold may be 32 bytes.

When the size of the compressed data is equal to or less than a first threshold, the cache controller 111 may store the compressed data in one of the storage spaces of the first area 13b-1 of the first cache memory 113a.

On the contrary, when the size of the compressed data is greater than the first threshold, the cache controller 111 may store the data requested for storage in one of the storage spaces of the second area 13b-2 of the first cache memory 113a. Along the dashed line shown in FIG. 3A, the cache controller 111 may directly store the data requested for storage, without compression, in one of the storage spaces of the second area 13b-2 of the first cache memory 113a. Alternatively, although it is not shown, the cache controller 111 may restore data, compressed by the compression unit 111a, to the original data by the restoration unit 111b and may store it in one of the storage spaces of the second area 13b-2.

When a request is made to read the data, the cache controller 111 controls the restoration unit 111b to restore the data stored in the first area 13b-1 (hereafter called compressed data) and may transfer the restored data to the controller 110. The cache controller 111 may transfer data stored in the second area 13b-2 (hereafter called non-compressed data) to the controller 110.

Referring to FIG. 3B, the cache controller 111 may include a compression unit 111a, a restoration unit 111b, a division unit 111c and a combining unit 111d.

When a request is made to store data (or to load or modify), the cache controller 111 transfers the data to be stored at cache memory 113b to the compression unit 111a, thereby compressing the data. The cache controller 111 may determine whether the compressed data is equal to or less than a preset size (hereafter called a second threshold). The second threshold may be a size of one of the storage spaces of the main area 13d-1. For example, the second threshold may be 32 bytes.

When the size of the compressed data is equal to or less than a second threshold, the cache controller 111 may store the compressed data in one of the storage spaces of the main area 13d-1 of the second cache memory 113b.

On the contrary, when the size of the compressed data is greater than the second threshold, the cache controller 111 may transfer the data requested for storage to the division unit 111c, and may store divided data in the main area 13d-1 and the reservation area 13d-2 of the second cache memory 113b, respectively. For example, when a request is made to store data of 64 bytes, which cannot be compressed to a size equal to or less than 32 bytes, the cache controller 111 may divide the data requested for storage into two parts, 32 bytes each, hereafter called first divided data part and second divided data part, so that the first divided data is stored in one of the storage spaces of the main area 13d-1 and the second divided data is stored in one of the storage spaces of the reservation area 13d-2. The cache controller 111 may store a location of a storage space of the reservation area 13d-2, in which the second divided data is stored, in the mapping information 13c-3 of a cache tag stored in the first section 113b-1. For example, when the second divided data is stored in the first storage space of the reservation area 13d-2, the cache controller 111 may store '1' in the mapping information 13c-3 of a cache tag. This is an example but does not limit the present disclosure. It will be appreciated that the embodiment of the present disclosure may be modified in various methods.

When making a request to read data, the cache controller 111 may determine whether the data requested to be read is compressed. When the data requested to be read is compressed, the cache controller 111 may restore the compressed data though the restoration unit 111b and may transfer the restored data to the controller 110. On the contrary, when the data requested to be read is not compressed (e.g., when the data requested to be read is stored, as divided parts of data, in the main area 13d-1 and the reservation area 13d-2 respectively), the cache controller 111 may detect a location, at which the second divided data is stored, through mapping information 13c-3 of a cache tag stored in the first section 113b-1, may combine the second divided data of the reservation area 13d-2 and the first divided data of the main area 13d-1 through the combining unit 111d, and may transfer the combined data to the controller 110.

The embodiment of FIG. 1 is illustrated as the cache memory 113 is included in the controller 110, but not limited thereto. For example, the cache memory 113 may be implemented as a separated component, so that it can be included in the electronic device 100 or other configurations (e.g., storage unit 120, display unit 131, or the like). Although the embodiment of the present disclosure is implemented in such a way that the electronic device 100 includes one cache memory 113, it should be understood that the present disclosure is not limited thereto. For example, the electronic device 100 may include a plurality of cache memories.

The storage unit 120 may store an operating system (OS) for the electronic device 100 and applications required for options, e.g., an audio playback function, an image/video playback function, an Internet access function, a text message-related function, a map service function, etc. The storage unit 120 may also store various data, e.g., video data, game data, music data, movie data, map data, etc. The storage unit 120 may store data or commands for controlling the electronic device 100. The data or commands may be stored the cache memory 113.

The storage unit 120 according to various embodiments of the present disclosure may store an application program for processing a procedure for loading or modifying data on the cache memory 113 and a procedure for reading data from the cache memory 113. The application program may include routines for: compressing data requested to be loaded or modified; restoring compressed data to the original data; storing data, compressed to a size equal to or less than a first threshold, in a first area 13b-1 and non-compressed data in a second area 13b-2; storing data, compressed to a size equal to or less than a second threshold, in a main area 13d-1 and non-compressed data, as divided parts of data, in a main area 13d-1 and a reservation area 13d-2, respectively; combining the divided parts of data stored in the main area 13d-1 and the reservation area 13d-2 with each other; etc.

The touch screen 130 may perform an input function and a display function. To this end, the touch screen 130 may include a display unit 131 and a touch sensing unit 133. While electronic device 100 is illustrated in FIG. 1 as including a touch screen 130 having a display unit 131 and touch sensing unit 133, one of ordinary skill in the art would recognize that any input and/or output device may be used.

The display unit 131 may display various menus associated with the electronic device 100. The display unit 131 may also display information entered by the user or to display to the user. The display unit 131 may be implemented with a liquid crystal display (LCD), an organic light emitting diode (OLED), an active matrix OLED (AMO-LED), or the like. The display unit 131 may display a variety of screens according to the use of the electronic device 100, e.g., a home screen, a menu screen, a web page screen, a call screen, etc. The display unit 131 may provide screens corresponding to applications or commands read from the cache memory 113, etc.

The touch sensing unit 133 is a system for providing an input function. The touch sensing unit 133 may receive a touch event from an input element, such as a user's fingers, a stylus pen, etc., that contacts or closely approaches the surface and may transfer information associated with the touch event to the controller 110. The touch sensing unit 133 detects touch events through the change in a physical quantity (e.g., capacitance, resistance, etc.) according to the contact or proximity of a touch input tool. The touch sensing unit 133 may transfer the detected touch event, such as a tap, drag, flick, long touch, double touch, multi-touch, etc., and the location information where the touch event is detected to the controller 110.

Although it is not shown in FIG. 1, the electronic device 100 may further include various types of components. For example, the electronic device 100 according to various embodiments of the present disclosure may selectively further include units having add-on functions as follows: a camera module for acquiring still images/videos; a broadcast module for receiving and transmitting broadcasts; digital audio source playback module, such as an MP3 player; etc.

Figure 4:
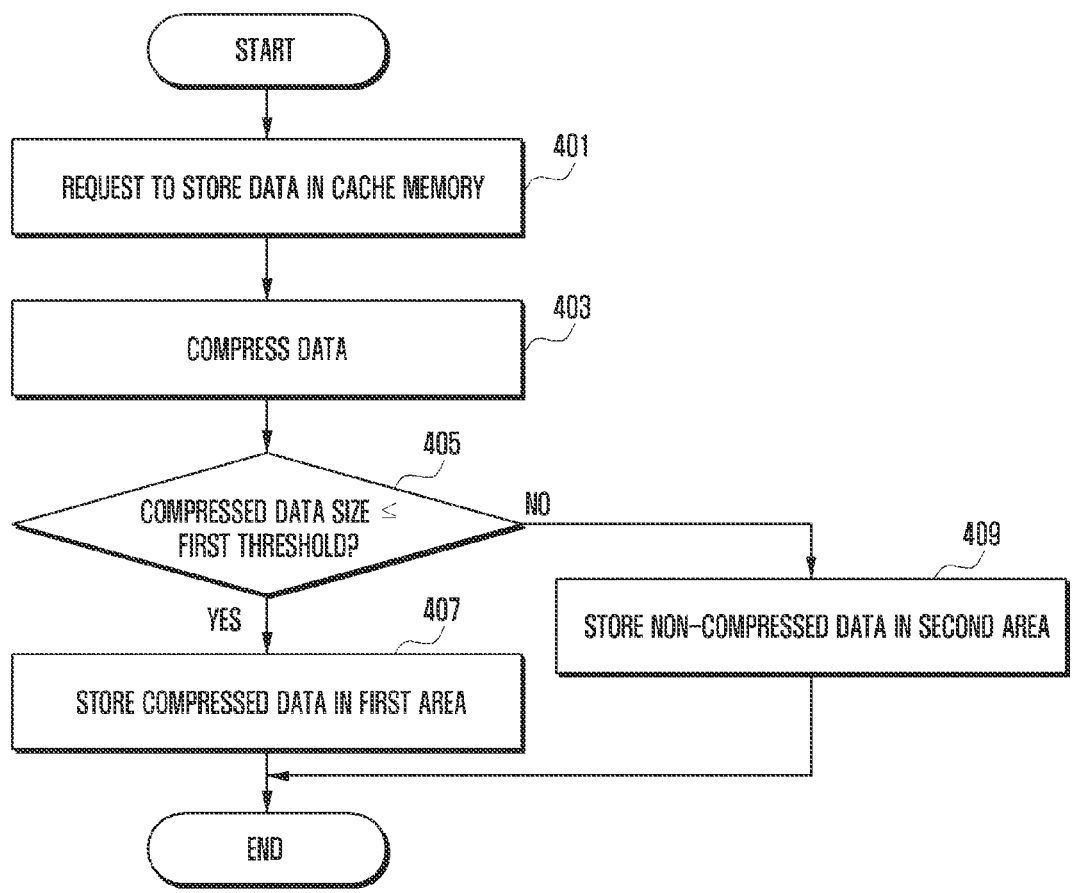
FIG. 4 is a flow chart that describes a method of storing data in cache memory shown in FIGS. 2A and 3A according to an embodiment of the present disclosure.

FIG. 4 is a flow chart that describes a method of storing data in cache memory shown in FIGS. 2A and 3A.

Referring to FIGS. 1 to 4, the cache controller 111 of the electronic device 100 according to various embodiments of the present disclosure may detect a request to store data in the first cache memory 113a at operation 401. The data storing request may include requests for loading and modifying data. When the data storing request is a request for modifying data, the cache controller 111 determines whether the data requested to be modified is located in the first area 13b-1 (e.g., whether the data requested to be modified is compressed data) after operation 401. When the data requested to be modified is not located in the first area 13b-1, the cache controller 111 may proceed with operation 409 that will be described later. When the data requested to be modified is located in the first area 13b-1, the cache controller 111 may proceed with operation 403.

The cache controller 111 may compress the data requested for storage in operation 403. For example, the cache controller 111 may transfer the data requested for storage to the compression unit 111a where the compression unit 111a compresses the data.

The cache controller 111 may determine whether the compressed data is in size equal to or less than a first threshold at operation 405. The first threshold may be a size of one of the storage spaces of the first area 13b-1. For example, the first threshold may be 32 bytes.

When the compressed data size is equal to or less than a first threshold in operation 405, the cache controller 111 may store the compressed data in the first area 13b-1 at operation 407. For example, the cache controller 111 may store the compressed data in one of the storage spaces of the first area 13b-1.

On the contrary, when the compressed data size is greater than the first threshold in operation 405, the cache controller 111 may store the data requested for storage (non-compressed data) in the second area 13b-2 at operation 409. For example, the cache controller 111 may store the non-compressed data in one of the storage spaces of the second area 13b-2. The cache controller 111 may also restore the compressed data of operation 403 through the restoration unit 111b and may store the restored data in one of the storage spaces of the second area 13b-2.

According to an embodiment of the present disclosure, when the second area 13b-2 for storing non-compressed data is infrequently used and the first area 13b-1 for storing compressed data is all used, the cache controller 111 may store data, which can be compressed to a size equal to or less than the first threshold, in the second area 13b-2 without compression, thereby enhancing the efficiency in the first cache memory 113a.

Figure 5:
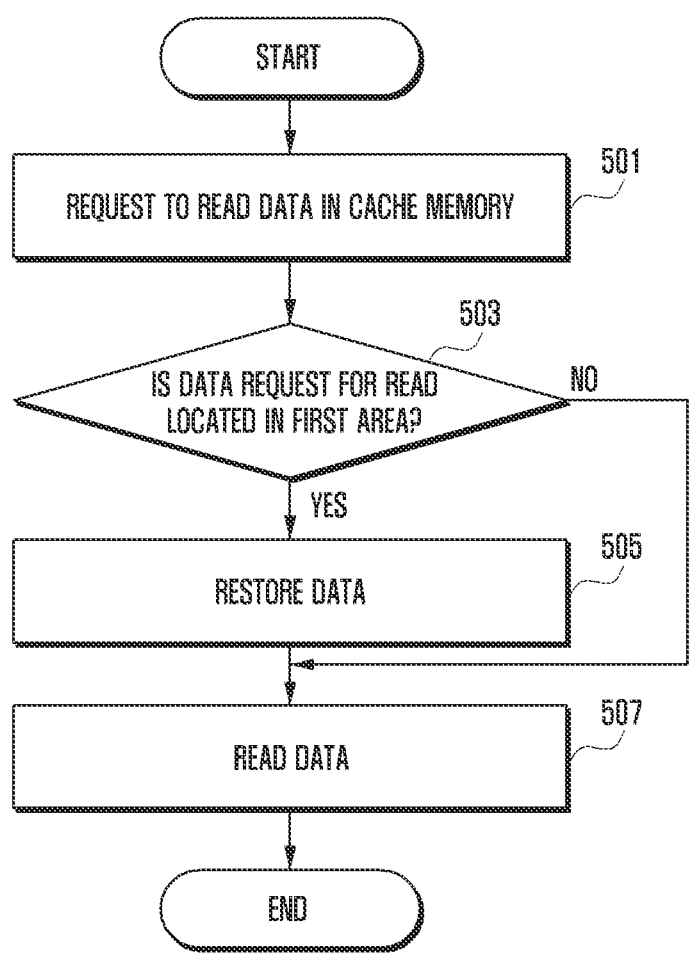
FIG. 5 is a flow chart that describes a method of reading data from cache memory shown in FIGS. 2A and 3A according to an embodiment of the present disclosure.

FIG. 5 is a flow chart that describes a method of reading data from cache memory shown in FIGS. 2A and 3A.

Referring to FIGS. 1 to 5, the cache controller 111 of the electronic device 100 according to an embodiment of the present disclosure may detect a request to read data in the first cache memory 113a at operation 501. The cache controller 111 may determine whether the data requested to be read is located in the first area 13b_1 at operation 503. That is, the cache controller 111 may determine whether the data requested to be read is compressed. The cache controller 111 may determine whether the data requested to be read is compressed through information indicating a compression state included the status information 13a-2 of the cache tag stored at the first section 113a-1.

When the data requested to be read is not located in the first area 13b-1 in operation 503, the cache controller 111 may proceed with operation 507 that will be describe later. On the contrary, when the data requested to be read is located in the first area 13b-1 in operation 503, the cache controller 111 may restore the compressed data in operation 505. For example, the cache controller 111 may restore the compressed data through the restoration unit 111b.

The cache controller 111 may read data in operation 507. For example, the cache controller 111 may transfer the restored data, restored from the compressed data stored in the first area 13b-1, or the non-compressed data, stored in the second area 13b-2, to the controller 110.

Figure 6:
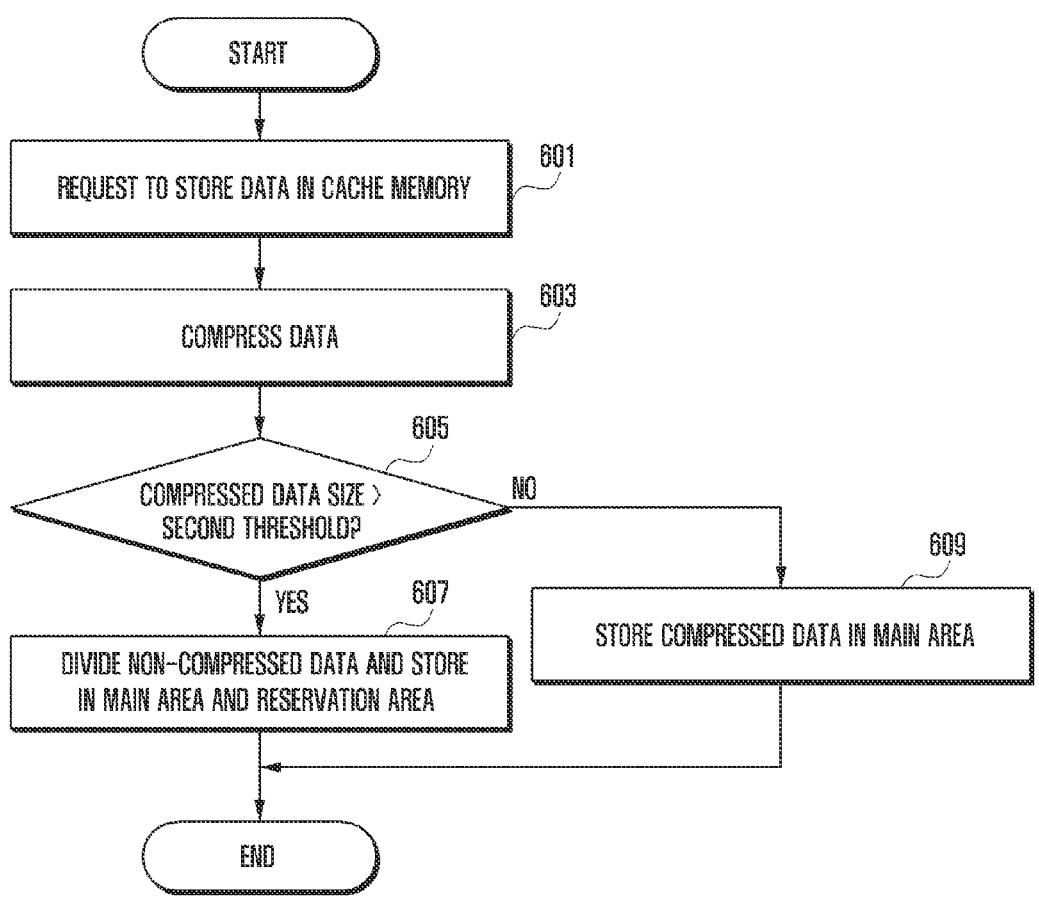
FIG. 6 is a flow chart that describes a method of storing data in cache memory shown in FIGS. 2B and 3B according to an embodiment of the present disclosure.

FIG. 6 is a flow chart that describes a method of storing data in cache memory shown in FIGS. 2B and 3B.

Referring to FIGS. 1 to 6, the cache controller 111 of the electronic device 100 according to various embodiments of the present disclosure may detect a request to store data in the second cache memory 113b at operation 601. The data storing request may include requests for loading and modifying data. When the data storing request is a request for modifying data, the cache controller 111 determines whether the data requested to be modified is compressed data after operation 601. When the data requested to be modified is compressed data, the cache controller 111 proceeds with operation 603. When the data requested to be modified is not compressed data, the cache controller 111 proceeds with operation 607.

The cache controller 111 may compress the data requested for storage in operation 603.

The cache controller 111 may determine whether the compressed data is in size greater than a second threshold at operation 605. The second threshold may be a size of one of the storage spaces of the main area 13*d*-1. For example, the second threshold may be 32 bytes.

When the compressed data size is greater than a second threshold in operation 605, the cache controller 111 may divide the data requested for storage (non-compressed data) and may store the divided parts of data in the main area 13*d*-1 and the reservation area 13*d*-2 at operation 607. For example, the cache controller 111 may divide non-compressed data into two divided parts of data by the division unit 111*c* and may store them in one of the storage spaces of the main area 13*d*-1 and one of the storage spaces of the reservation area 13*d*-2. More specifically, the cache controller 111 may divide non-compressed data, based on the size of the storage spaces of the main area 13*d*-1 and the reservation area 13*d*-2. For example, when each of the storage spaces of the main area 13*d*-1 and the reservation area 13*d*-2 is 32 bytes, the cache controller 111 may divide non-compressed data into two divided parts of data, 32 bytes each, and may store one (e.g., the first divided data) in one of the storage spaces of the main area 13*d*-1 and the other (e.g., the second divided data) in one of the storage spaces of the reservation area 13*d*-2. When the storage spaces of the main area 13*d*-1 and the reservation area 13*d*-2 are 24 bytes and 40 bytes, respectively, the cache controller 111 may divide non-compressed data into two divided parts of data, 24 bytes and 40 bytes, and may store the data of 24 bytes (e.g., the first divided data) in one of the storage spaces of the main area 13*d*-1 and the data of 40 bytes (e.g., the second divided data) in one of the storage spaces of the reservation area 13*d*-2.

The cache controller 111 may store location information about a storage space of the reservation area 13*d*-2, in which the second divided data is stored, in the mapping information 13*c*-3 of a cache tag stored at the first section 113*b*-1.

On the contrary, when the compressed data size is equal to or less than the second threshold in operation 605, the cache controller 111 may store the compressed data in the main area 13*d*-1 at operation 609. For example, the cache controller 111 may store the compressed data in one of the storage spaces of the main area 13*d*-1.

Figure 7:
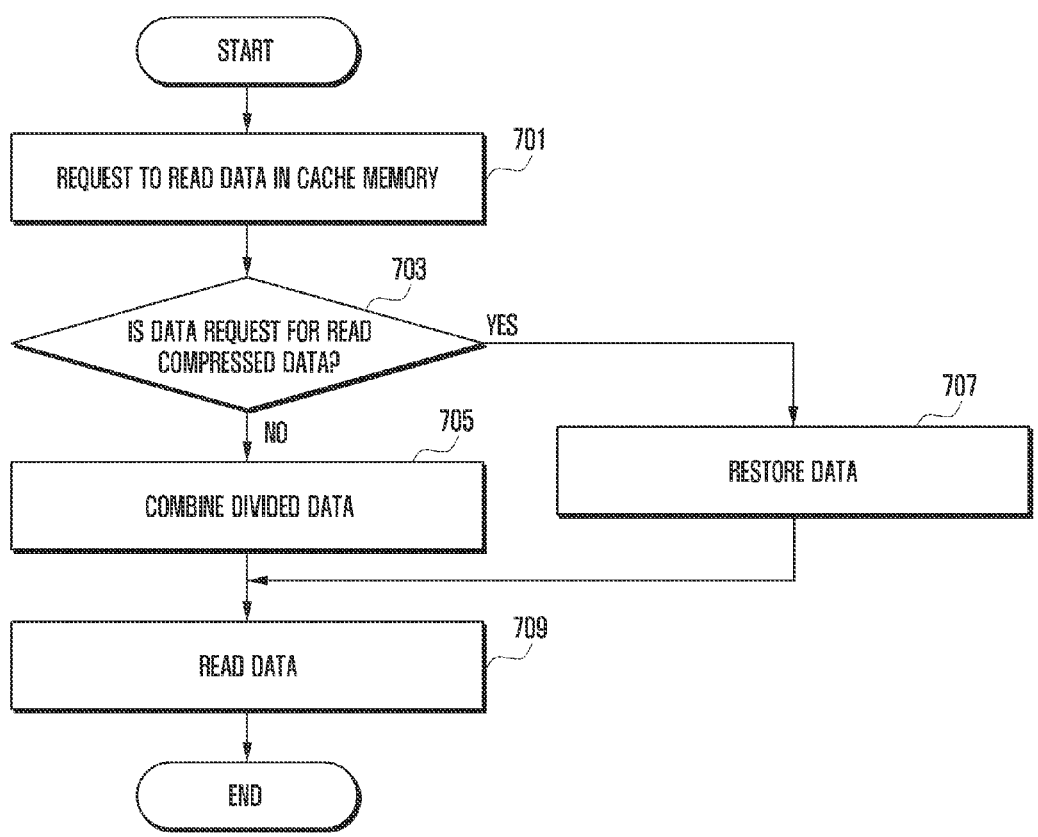
FIG. 7 is a flow chart that describes a method of reading data from cache memory shown in FIGS. 2B and 3B according to an embodiment of the present disclosure.

FIG. 7 is a flow chart that describes a method of reading data from cache memory shown in FIGS. 2B and 3B.

Referring to FIGS. 1 to 7, the cache controller 111 of the electronic device 100 according to an embodiment of the present disclosure may detect a request to read data in the second cache memory 113*b* at operation 701. The cache controller 111 may determine whether the data requested to be read is compressed at operation 703. The cache controller 111 may determine whether the data requested to be read is compressed through the status information 13*c*-2 of a cache tag stored in the first section 113*b*-1.

When the data requested to be read is not compressed data in operation 703, the cache controller 111 may combine divided data at operation 705. For example, the cache controller 111 may combine first divided data and second divided data, stored in the main area 13*d*-1 and reservation area 13*d*-2, through the combining unit 111*d*. The cache controller 111 may detect the location information about a storage space of the reservation area 13*d*-2, in which the second divided data is stored, through the mapping information 13*c*-3 of a cache tag stored in the first section 113*b*-1.

On the contrary, when the data requested to be read is compressed data in operation 703, the cache controller 111 may restore the compressed data at operation 707. For example, the cache controller 111 may restore the compressed data through the restoration unit 111*b*.

The cache controller 111 may read data at operation 709. For example, the cache controller 111 may transfer the restored data, restored from the compressed data, or the combined data, created as divided parts of data are combined, to the controller 110.

Although it is not shown in FIG. 7, the embodiment of the present disclosure may be modified as follows. That is, the determination of operation 703 may be modified in such a way that the cache controller 111 determines whether the data requested to be read is a divided part of data. The cache controller 111 may determine whether the data requested to be read is a divided part of data through the mapping information 13*c*-3 of a cache tag stored in the first section 113*b*-1. For example, when the data requested to be read is in the mapping information 13*c*-3 of a cache tag stored in the first section 113*b*-1, the cache controller 111 ascertains that the data requested to be read is a divided part of data and proceeds with operation 705. On the contrary, when the data requested to be read is not in the mapping information 13*c*-3 of a cache tag stored in the first section 113*b*-1, the cache controller 111 ascertains that the data requested to be read is not a divided part of data and proceeds with operation 707.

Figure 8:
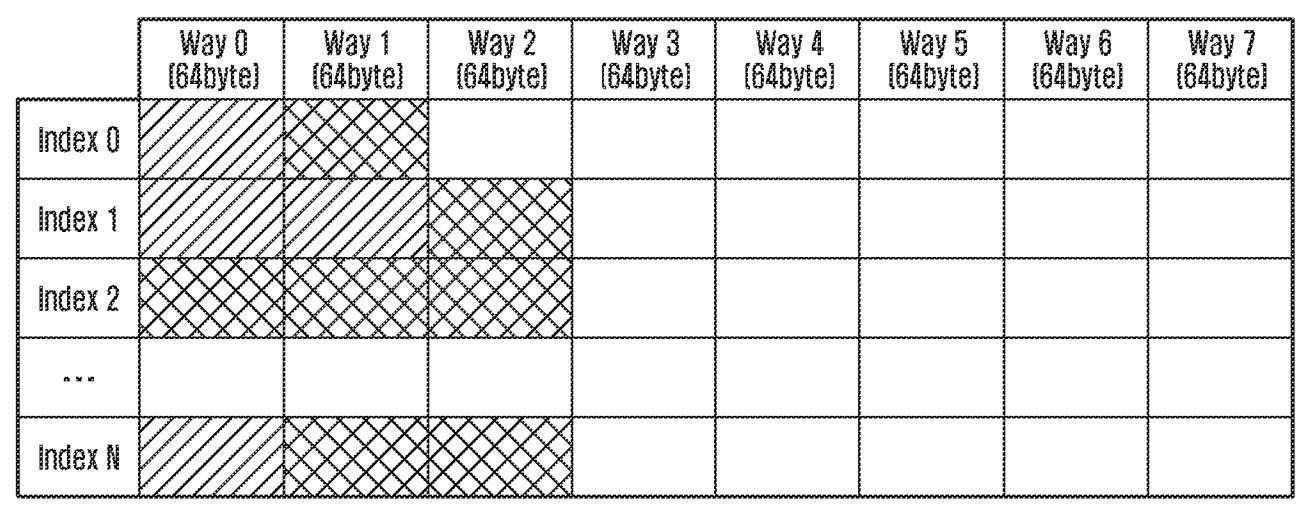

FIG. 8 is a diagram that describes a state of a cache memory storing data according to the related art. FIG. 9 is a diagram that describes a state of cache memory shown in FIGS. 2A and 3A that store data. FIG. 10 is a diagram that describes a state of cache memory shown in FIGS. 2B and 3B that store data.

Referring to FIGS. 8 to 10, the diagonal patterns refer to data that is not compressed to a size equal to or less than a first threshold or a second threshold and the net patterns refer to data that is compressible or compressed to a size equal to or less than a first threshold or a second threshold.

Referring to FIG. 8, a cache memory of the related art may include N cache lines (N is a positive integer). Each cache line may include 8 storage spaces, Way 0 to Way 7. Each storage space has a size of 64 bytes as the basic unit of data storage. In cache memories of the related art, every cache line is 512 bytes (=64×8). That is, cache memories of the related art are designed so that the storage spaces are all the same in size. Cache memories of the related art store compressible data without compression.

Referring to FIG. 9, the first cache memory 113*a* according to various embodiments of the present disclosure may include N cache lines (N is a positive integer) each of which has eight storage spaces Way0 to Way7. According an embodiment of the present disclosure, the first cache memory 113*a* may implemented in such a way that each cache line has four storage spaces Way0 to Way3 (second area 13*b*_2) each of which is 64 bytes and each cache line has four storage spaces Way4 to Way7 (first area 13*b*_1) each of which is 32 bytes. Each cache line of the first cache memory 113*a* according to an embodiment of the present disclosure is 384 bytes (=64×4+32×4) in total. Although the summation of the number of storage spaces of the first area 13*b*-1 and the number of storage spaces of the second area 13b-2 of each cache line in the first cache memory 113a according to embodiments of the present disclosure is the same number of storage spaces of one cache line of the cache memory according to the related art, the total size of each cache line according to the embodiment of the present disclosure is less than the size of the cache memory according to the related art.

It should, however, be understood that the present disclosure is not limited to the embodiment shown in FIG. 9. For example, the number of storage spaces between the first area 13b-1 and the second area 13b-2 may be set to various ratios. For example, the first area 13b-1 may include 3 storage spaces and the second area 13b-2 may include 5 storage spaces. In addition, the size of the storage spaces of the first area 13b-1 may be set to various values. For example, the size of the storage spaces of the first area 13b-1 may be set according to a data compression ratio for data that is mainly processed.

As shown in FIG. 9, the first cache memory 113a according to an embodiment of the present disclosure may compress data, compressible to a size equal to or less than a first threshold, and may store the compressed data in one of the storage spaces of the first area 13b-1. The first cache memory 113a may store data, not compressible to a size equal to or less than a first threshold, in one of the storage spaces of the second area 13b-2. For example, for "Index0," the first data may be stored in the first storage space, Way0, without compression, and the second data may be compressed and stored in the fifth storage space, Way 4.

In comparison with the embodiment of the present disclosure shown in FIG. 8, for data stored in "Index 0", in order to store two items of data, cache memories of the related art use a storage space of 128 bytes (=64×2); however, the first cache memory 113a according to an embodiment of the present disclosure uses a storage space of 96 bytes (=64+32).

Similarly, for data stored in "Index 1", in order to store three items of data, cache memories of the related art use a storage space of 192 bytes (=64×3); however, the first cache memory 113a according to an embodiment of the present disclosure uses a storage space of 160 bytes (=64×2+32).

For data stored in "Index 2", in order to store three items of data, cache memories of the related art use a storage space of 192 bytes (=64×3); however, the first cache memory 113a according to an embodiment of the present disclosure uses a storage space of 96 bytes (=32×3).

In addition, for data stored in "Index N", in order to store three items of data, cache memories of the related art use a storage space of 192 bytes (=64×3); however, the first cache memory 113a according to an embodiment of the present disclosure uses a storage space of 128 bytes (=64+32×2). As such, the first cache memory 113a according to the present disclosure may store data in less storage space than cache memories of the related art, thereby enhancing the efficiency of storage space.

Referring to FIG. 10, the second cache memory 113b according to various embodiments of the present disclosure may include N cache lines (N is a positive integer). Each cache lines may include a main area 13d-1 with eight storage spaces Way0 to Way7 and a reservation area 13d-2 with four storage spaces Pre-way0 to Pre-way3 (second area 13b-2). Each of the storage spaces of the main area 13d-1 and reservation area 13d-2 may have a size of 32 bytes. Each cache line of the second cache memory 113b according to an embodiment of the present disclosure is 384 bytes (=32×12).

It should, however, be understood that the present disclosure is not limited to the embodiment shown in FIG. 10. For example, the size of the storage spaces of the main area 13d-1 and the reservation area 13d-2 and the number of storage spaces of the reservation area 13d-2 may be set to various values according to the manufacturer's design or the attributes of data.

As shown in FIG. 10, the second cache memory 113b may divide non-compressed data, not compressible to a size equal to or less than a second threshold (e.g., 32 bytes), into divided parts of data and may store one of them in one of the storage spaces of the main area 13d-1 and the other in one of the storage spaces of the reservation area 13d-2. Information about connection between data that are divided and stored in the main area 13d-1 and the reservation area 13d-2 may be stored in the mapping information 13c-3 of a cache tag stored at a first section 113b-1. The second cache memory 113b may store the compressed data (compressible to a size equal to or less than the second threshold) in one of the storage spaces of the main area 13d-1.

For example, for data stored in 'Index 0,' one non-compressed data item may be divided into divided parts of data. One of them may be stored in first storage space Way0 of the main area 13d-1 and the other may be stored in the first storage space Pre-way0 of the reservation area 13d-2. The compressed data may be stored in the second storage space Way1 of the main area 13d-1. In that case, the second cache memory 113b according to an embodiment of the present disclosure uses a storage space of 96 bytes (=32×3).

For data stored in 'Index 1,' two non-compressed data items may be divided into divided parts of data, one of which may be stored in first storage space Way0 of the main area 13d-1 and the first storage space Pre-way0 of the reservation area 13d-2, and the other of which may be stored in the second storage space Way1 of the main area 13d-1 and the second storage space Pre-way1 of the reservation area 13d-2; and one compressed data item may be stored in the third storage space Way2 of the main area 13d-1. In that case, the second cache memory 113b according to an embodiment of the present disclosure uses a storage space of 160 bytes (=32×5).

For data stored in 'Index 2,' since non-compressed data do not exist, no data is stored in the storage spaces of the reservation area 13d-2, and three compressed data items may be stored in the first to third storage spaces Way0 to Way2. In that case, the second cache memory 113b according to an embodiment of the present disclosure uses a storage space of 96 bytes (=32×3).

For data stored in 'Index N,' one non-compressed data item may be divided into divided parts of data. One of them may be stored in first storage space Way0 of the main area 13d-1 and the other in the first storage space Pre-way0 of the reservation area 13d-2. Two compressed data items are the second storage space Way1 and the third storage space Way2 of the main area 13d-1. In that case, the second cache memory 113b according to an embodiment of the present disclosure uses a storage space of 128 bytes (=32×4). As such, the second cache memory 113b according to an embodiment of the present disclosure may store data in less storage space than the cache memory of the related art shown in FIG. 8.

As shown in FIGS. 9 and 10, the embodiments of the present disclosure may more efficiently use the cache memory than the related arts. Therefore, although the embodiments of the present disclosure use a smaller cache memory than the systems of the related art, they can provide the same performance as the cache memory of the related art.

The embodiments of the present disclosure may be adapted to the environment where the cache memory is using data. For example, in the embodiment shown in FIG. 9, since the size of area for storing non-compressed data is fixed, the first cache memory 113a may be limited in operation; however it may be easily implemented.

The embodiment of the present disclosure shown in FIG. 10 does not have a limitation on storage location for compressed data and non-compressed data. However, in the embodiment of FIG. 10, one part of non-compressed data is stored in any storage space of the main area 13d-1 and the other of non-compressed data is stored in any storage space of the reservation area 13d-2; and the storage location of the other is recorded in the mapping information in a cache tag stored in the first section 113b-1. That is, implementation of the second cache memory 113b may be relatively more complicated than that of the first cache memory 113a.

As described above, the electronic device with a cache memory and the method of operating the electronic device, according to various embodiments of the present disclosure, can be configured in such a way that: storage spaces of the cache memory are divided into a first area and a second area, where the second area has the basic unit of data to be stored in the cache memory and the first area has a smaller size than the basic unit. Meanwhile, the cache memory of the related art is designed in such a way that every storage space has the basic unit of data. Therefore, the electronic device with a cache memory and the method of operating the electronic device, according to various embodiments of the present disclosure, can reduce the total size of the cache memory to less than the cache memory of the related art. In addition, the various embodiments of the present disclosure can store data, compressible to a size equal to or less than a first threshold (the size of each of the storage spaces of the first area), in the first area; and data, not compressible to a size equal to or less than a first threshold, in the second area without compression, thereby efficiently managing the cache memory.

The various embodiments of the present disclosure can be configured in such a way that a cache memory is divided into a main area and a reservation area; and the main area and the reservation area have a smaller size than the basic unit to be stored in the cache memory. Meanwhile, the cache memory of the related art is designed in such a way that every storage space has the basic unit of data. Therefore, the various embodiments of the present disclosure can reduce the total size of the cache memory to less than the cache memory of the related art. In addition, the various embodiments of the present disclosure can compress and store data, compressible to a size equal to or less than a second threshold (the size of each of the storage spaces of the main area), in the main area; and can divide data, not compressible to a size equal to or less than a second threshold, into divided parts of data and store them in the main area and the reservation area without compression, thereby efficiently managing the cache memory.

The various embodiments of the present disclosure can reduce the total size of the cache memory to be less than the cache memory of the related art, thereby reducing the cost of electronic devices with the cache memory.

As described above, part of the method (e.g., operations) or system (e.g., modules or functions) according to various embodiments of the present disclosure can be implemented with command instructions that can be conducted via various types of computers and stored in computer-readable storage media, as types of programming modules, for example. One or more processors (e.g., controller 110) can execute commend instructions, thereby performing the functions. An example of the computer-readable storage media may be a storage unit 120. At least part of the programming modules can be implemented (executed) by the processor, for example. At least part of the programming module includes modules, programs, routines, sets of instructions or processes, etc., for example, in order to perform one or more functions.

Examples of computer-readable media include magnetic media, such as hard disks, floppy disks, and magnetic tape; optical media such as compact disc read only memory (CD-ROM) discs and digital versatile discs (DVDs); magneto-optical media, such as floptical disks; and hardware devices that are specially configured to store and perform program instructions (programming modules), such as ROM, RAM, flash memory, etc. Examples of program instructions include machine code, such as produced by a compiler, and files containing higher level code that may be executed by the computer using an interpreter. The described hardware devices may be configured to act as one or more software modules in order to perform the operations and methods described above, or vice versa.

Modules or programming modules according to various embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a cache memory including a plurality of cache lines each of which includes a reservation area and a main area with at least one storage space that has a size less than a predetermined size of data storage; and
    a cache controller configured to:
        compress the data requested to be stored in the cache memory if a request is made to store data in the cache memory,
        determine whether the compressed data is equal to or less than the size of one of the at least one storage space of the main area,
        store the compressed data in one of the storage spaces of the main area if the compressed data is equal to or less than the size of the at least one storage space of the main area,
    wherein the cache controller is further configured to:
        divide, the data requested for storage into divided parts of data if the compressed data is greater than the size of one of the storage spaces of the main area and the size of the divided part of data is equal to or less than the size of one of the storage space of the main area and the reservation area, and
        store one divided part of data in one of the storage spaces of the main area and the other in one of the storage spaces of the reservation area without compression.

2. The electronic device of claim 1, wherein the cache memory comprises:

a cache data memory configured to store the data requested for storage, the cache data memory including the main area and the reservation area; and a cache tag, including address information of data stored in the cache data memory and status information, configured to map information about the divided parts of data stored in the main area and reservation area.

3. The electronic device of claim 1, wherein the size of one storage space of the main area and the size of one storage space of the reservation area are added to produce a summation; and wherein the summation is the predetermined size of data storage.

4. The electronic device of claim 3, wherein the size of one storage space of the main area is identical to that of one storage space of the reservation area.

5. The electronic device of claim 2, wherein the cache controller comprises:

a compression unit configured to compress the data requested to be stored in the cache memory;

a restoration unit configured to restore compressed and stored data to the original data if a request is made to read data;

a division unit configured to divide data that is not compressed to a size equal to or less than the size of one storage space of the main area; and a combining unit configured to combine divided, stored data with each other if a request is made to read data from the cache memory.

6. The electronic device of claim 5, wherein the combining unit is further configured to detect a location in the reservation area where data to be combined with data stored in the main area is stored if combining the divided, stored data with each other through the mapping information.

7. A method of managing a cache memory with a plurality of cache lines each of which includes a reservation area and a main area with at least one storage space that has a size less than a predetermined size of data storage, the method comprising:

detecting a request is made to store data in the cache memory;

compressing the data requested for storage;

determining whether the compressed data is equal to or less than the size of one of the storage spaces of the main area;

storing the compressed data in one of the storage spaces of the main area, if the compressed data is equal to or less than the size of one of the storage spaces of the main area;

dividing the data requested for storage into divided parts of data if the compressed data is greater than the size of one of the storage spaces of the main area and the size of the divided part of data is equal to or less than the size of one of the storage spaces of the main area and the reservation area; and storing one divided part of data in one of the storage spaces of the main area and the other in one of the storage spaces of the reservation area without compression.

8. The method of claim 7, further comprising:

detecting a request to read data from the cache memory;

determining whether the data requested to be read is compressed;

combining divided parts of data stored in the main area and reservation area with each other and reading the combined data if the data requested to be read is not compressed; and restoring compressed data stored in the main area and reading the restored data if the data requested to be read is compressed.

9. The method of claim 8, wherein combining divided parts of data stored in the main area and reservation area with each other comprises:

detecting a location in the reservation area where data to be combined with data stored in the main area is stored based on the mapping information.

* * * * *